United States Patent
Lu et al.

(10) Patent No.: US 11,969,647 B2
(45) Date of Patent: Apr. 30, 2024

(54) CONTROL ASSEMBLY FOR PORTABLE ELECTRONIC DEVICE

(71) Applicant: DEXIN CORP., New Taipei (TW)

(72) Inventors: Ho Lung Lu, New Taipei (TW); Shih-Hsiung Hsiao, New Taipei (TW)

(73) Assignee: DEXIN CORP., New Taipei (TW)

( * ) Notice: Subject to any disclaimer, the term of this patent is extended or adjusted under 35 U.S.C. 154(b) by 210 days.

(21) Appl. No.: 17/747,787

(22) Filed: May 18, 2022

(65) Prior Publication Data

US 2023/0050323 A1     Feb. 16, 2023

Related U.S. Application Data

(60) Provisional application No. 63/232,886, filed on Aug. 13, 2021.

(30) Foreign Application Priority Data

Jan. 7, 2022    (TW) .................................. 111100668

(51) Int. Cl.
    *A63F 13/24*       (2014.01)
    *A63F 13/92*       (2014.01)

(52) U.S. Cl.
    CPC .............. *A63F 13/24* (2014.09); *A63F 13/92* (2014.09)

(58) Field of Classification Search
None
See application file for complete search history.

(56) References Cited

U.S. PATENT DOCUMENTS

| | | | |
|---|---|---|---|
| 2013/0341214 A1* | 12/2013 | King | A63F 13/98 206/216 |
| 2015/0018101 A1* | 1/2015 | Schoenith | A63F 13/98 463/37 |
| 2015/0149668 A1* | 5/2015 | Joynes | G06F 3/0219 710/62 |
| 2016/0001176 A1* | 1/2016 | Chen | A63F 13/24 463/37 |

* cited by examiner

*Primary Examiner* — Jason T Yen
(74) *Attorney, Agent, or Firm* — Maschoff Brennan (57) ABSTRACT

A control assembly adapted for an electronic device is provided, the control assembly includes a mount seat, at least one link component, and two controllers, the mount seat is configured to be installed on the electronic device, the mount seat has a support surface configured to support the electronic device, the link component is connected to the mount seat, the two controllers are configured to electronic communicate with the electronic device, the two controllers are separated from each other and movably connected to the mount seat via the at least one link component, the two controllers are spaced apart from the support surface of the mount seat along a normal direction of the support surface so that an orthogonal projection of the electronic device along the normal direction of the support surface overlaps at least part of each of the two controllers.

10 Claims, 7 Drawing Sheets

CONTROL ASSEMBLY FOR PORTABLE ELECTRONIC DEVICE

CROSS-REFERENCE TO RELATED APPLICATIONS

This application claims the priority benefits of U.S. provisional application Ser. No. 63/232,886, filed on Aug. 13, 2021 and priority under 35 U.S.C. § 119(a) on Patent Application No(s). 111100668 filed in Taiwan (R.O.C.) on Jan. 7, 2022. The entirety of each of the above-mentioned patent application is hereby incorporated by reference herein.

TECHNICAL FIELD

The disclosure relates to a control assembly for portable electronic device.

BACKGROUND

In recent years, with the development of science and technology, people can play various games on smartphones. Meanwhile, the smartphone's screen trend is changed from physical keypad to touch screen, thus smartphone games are mostly designed to be touchscreen-based. Even though there is a virtual controller, it is very inconvenient to play because it hides some part of the screen and lacks tactile feedback.

To this end, smartphone-based controllers are developed to provide physical buttons for users to run games smoothly. However, among the conventional smartphone-based controllers, the smartphone is mostly held in a position not ergonomic for users.

SUMMARY

Accordingly, one aspect of the disclosure is to provide a control assembly which enables an ergonomic operation.

One embodiment of the disclosure provides a control assembly adapted for an electronic device and including a mount seat, at least one link component, and two controllers, the mount seat is configured to be installed on the electronic device, the mount seat has a support surface configured to support the electronic device, the link component is connected to the mount seat, the two controllers are configured to electronic communicate with the electronic device, the two controllers are separated from each other and movably connected to the mount seat via the at least one link component, the two controllers are spaced apart from the support surface of the mount seat along a normal direction of the support surface so that an orthogonal projection of the electronic device along the normal direction of the support surface overlaps at least part of each of the two controllers.

According to the control assembly as discussed in the above embodiment of the disclosure, the controllers can be kept partially overlapping with the electronic device supported by the support surface, thus the control assembly is able to achieve an ergonomic operation of the electronic device for users.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Some exemplary embodiments of the disclosure will be described in detail below with reference to FIGS. 1-12, and the details given in the following paragraphs are merely provided for better comprehension of the spirit of the disclosure.

Firstly, please refer to FIG. 1, exemplary embodiments of the disclosure generally provide a control assembly 1 suitable for a portable electronic device 9 (also called "electronic device 9" hereinafter). The electronic device 9 may be but not limited to be any typical smartphone. The control assembly 1 is able to communicate with the electronic device 9 in any suitable wireless or wired manner so as to provide an approach for users to control the electronic device 9.

As shown, the control assembly 1 may include a mount seat 11, at least one link component 13, a controller 21, and a controller 22. The mount seat 11 means the part of the control assembly 1 that can be used to support or fix the electronic device 9. Any means that are suitable for stably holding the electronic device 9 in position can be employed as the mount seat 11 of the disclosure.

The link component 13 means the part of the control assembly 1 that can be used to be connected between the mount seat 11 and the controllers 21 and 22. As shown, the link component 13 may include at least one linking part 131 and at least one linking part 132. The linking part 131 and the linking part 132 are movably connected to two opposite sides of the mount seat 11, respectively. The controllers 21 and 22 are respectively connected to the linking parts 131 and 132; in other words, the controllers 21 and 22 are connected to the mount seat 11 respectively via the linking parts 131 and 132.

The controllers 21 and 22 mean the handheldable parts of the control assembly 1 that can be used to control the electronic device 9. Any means that are handheldable and capable of pairing with and controlling the electronic device 9 can be employed as the controllers 21 and 22 of the disclosure. Since the linking part 131 and the linking part 132 are respectively movably connected to two opposite sides of the mount seat 11, the controllers 21 and 22 are movable with respect to the mount seat 11 and the electronic device 9 on the mount seat 11. Thus, the controllers 21 and 22 are able to be moved to suitable positions as required whether they are paired with the electronic device 9 or not. Also, the controllers 21 and 22 are respectively movably connected to the linking part 131 and the linking part 132, such that the position of each of the controllers 21 and 22 relative to the electronic device 9 is much more flexible.

In specific, with the arrangement of the mount seat 11, the link component 13, and the controllers 21 and 22, the distance between the controllers 21 and 22, the distance between the electronic device 9 and the controllers 21 and/or 22, and the angle of each of the controllers 21 and 22 to the electronic device 9 are all adjustable as required.

Also, the arrangement of the mount seat 11 and the link component 13 is able to keep the controllers 21 and 22 in a specific area nearby the electronic device 9. Please further refer to FIG. 2, by the mount seat 11 and the link component 13, the controllers 21 and 22 are arranged underneath the electronic device 9; in specific, each of the controllers 21 and 22 partially overlaps with a display screen 91 of the electronic device 9; in other words, the electronic device 9 is kept above the controllers 21 and 22 and its display screen 91 is overlapping with part of the controllers 21 and 22.

Figure 2:
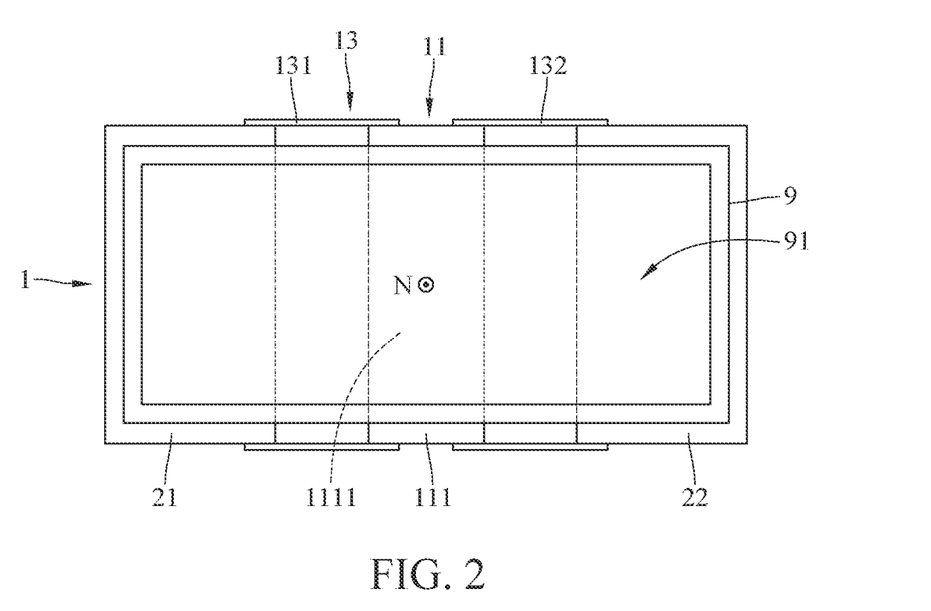
FIG. 2 is a top view of the control assembly and the electronic device in FIG. 1.

The display screen 91 herein may mean the glass part of a display of the electronic device 9 used to display image. In one example, the display screen 91 may be a touch screen. Generally, based on user's viewing angle, the display screen 91 indicates the front side of the electronic device 9, and the side of the electronic device 9 opposite to the display screen 91 is basically called a rear side or backside of the electronic device 9. Accordingly, the term "overlapping" herein is taken along the direction of how user views the display screen 91, where the direction may be parallel to a normal direction of the display screen 91 or a normal direction N of a support surface 1111 of the mount seat 11. As such, an orthogonal projection of each of the controllers 21 and 22 in the normal direction of the display screen 91 or the normal direction N of a support surface 1111 of the mount seat 11 overlaps with the display screen 91. The support surface 1111 herein means a surface of the mount seat 11 used to directly or indirectly support the electronic device 9.

Since the display screen 91 of the electronic device 9 is kept to partially overlap with the controllers 21 and 22 in the viewing angle (in other words, the controllers 21 and 22 are kept underneath the display screen 91 of the electronic device 9), the control assembly 1 achieves an ergonomic operation of the electronic device 9 for users.

Figure 1:
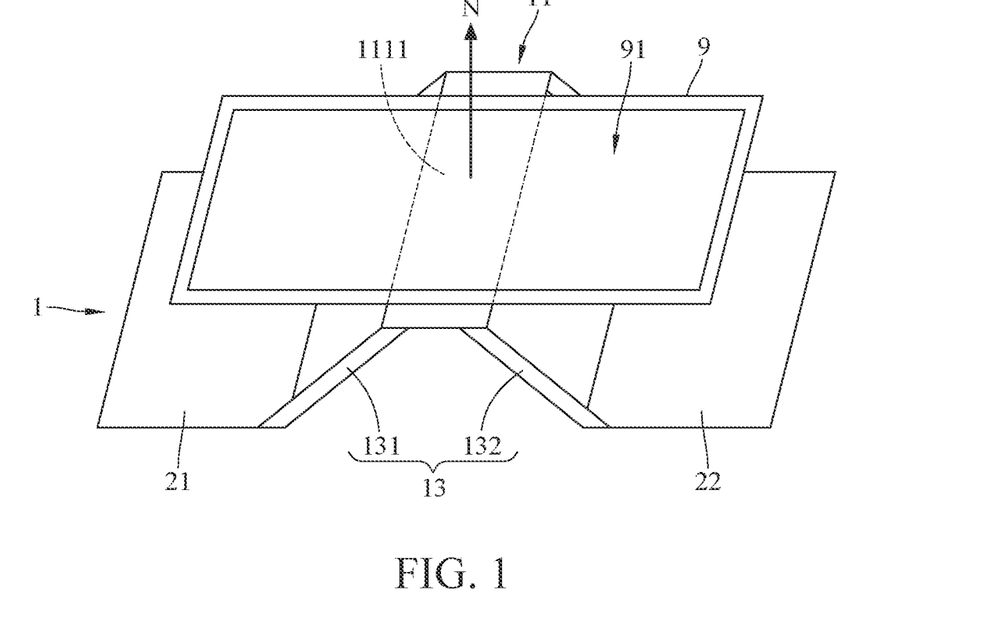
FIG. 1 is a schematic view of a control assembly according to one embodiment of the disclosure being applied on an electronic device.

It is noted that FIGS. 1-2 merely provide one of the basic conceptual configurations of the control assembly 1 that is capable of making the controllers 21 and 22 overlap under the electronic device 9. Any suitable mean or alternative arrangement that can embody the same purpose can be employed in the control assembly 1. For example, please refer to FIG. 3, the linking part 131 of the link component 13 are arranged between the controllers 21 and 22, and the linking part 131 is connected to the mount seat 11 via the linking part 132; in more detail, the controllers 21 and 22 may be respectively movably or immovably connected to two opposite ends of the linking part 131, one end of the linking part 132 may be movably or immovably connected to the linking part 131, and the other end of the linking part 132 may be movably or immovably connected to the mount seat 11.

Figure 3:
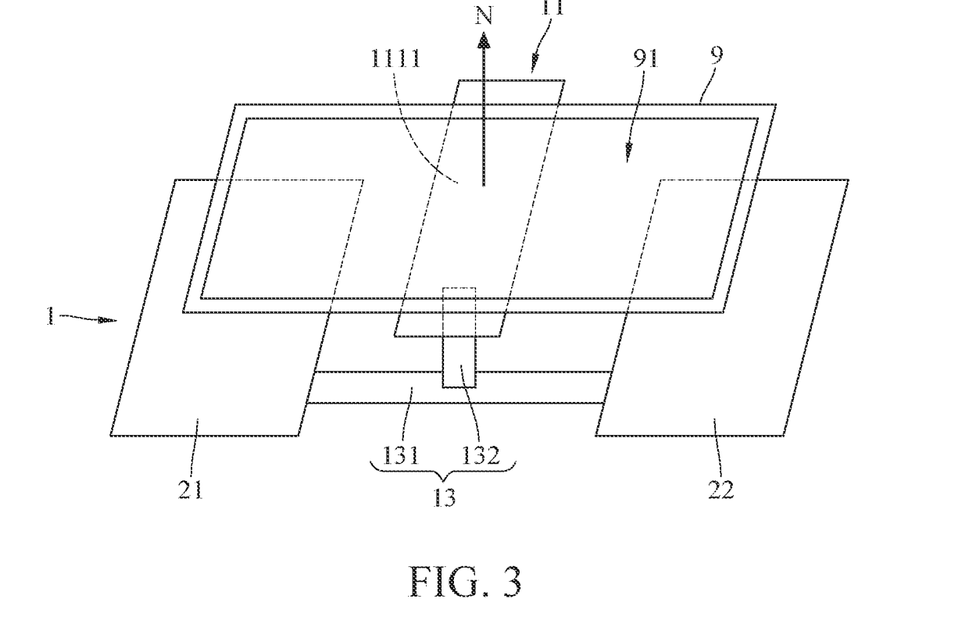
FIG. 3 is a schematic view of a control assembly according to another embodiment of the disclosure being applied on an electronic device.

FIGS. 1-3 are schematically depicted in a simplified manner merely for explaining the basic configurations of the control assembly 1. Any suitable means or mechanism that can embody the same arrangement as shown in FIGS. 1-3 can be employed in the control assembly 1.

Figure 4:
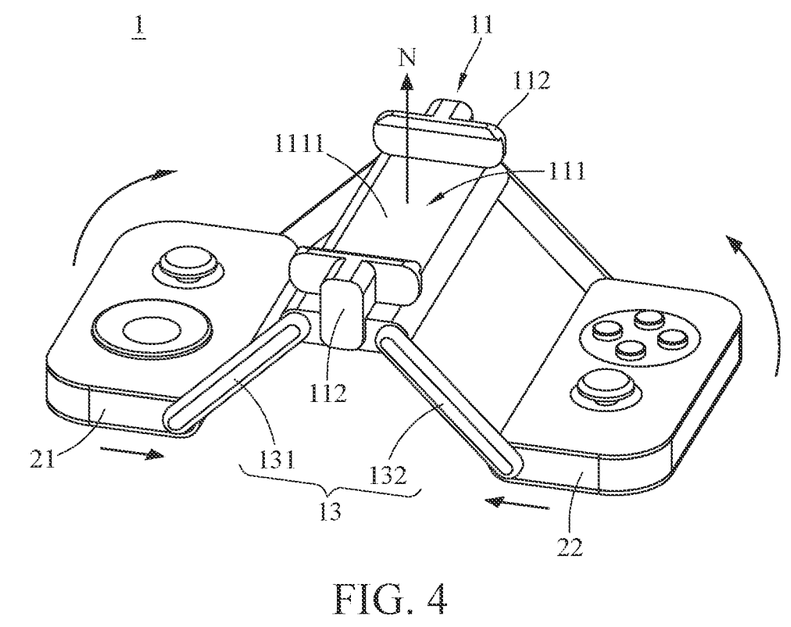
FIG. 4 is a perspective view of a control assembly according to one embodiment of the disclosure.
Figure 5:
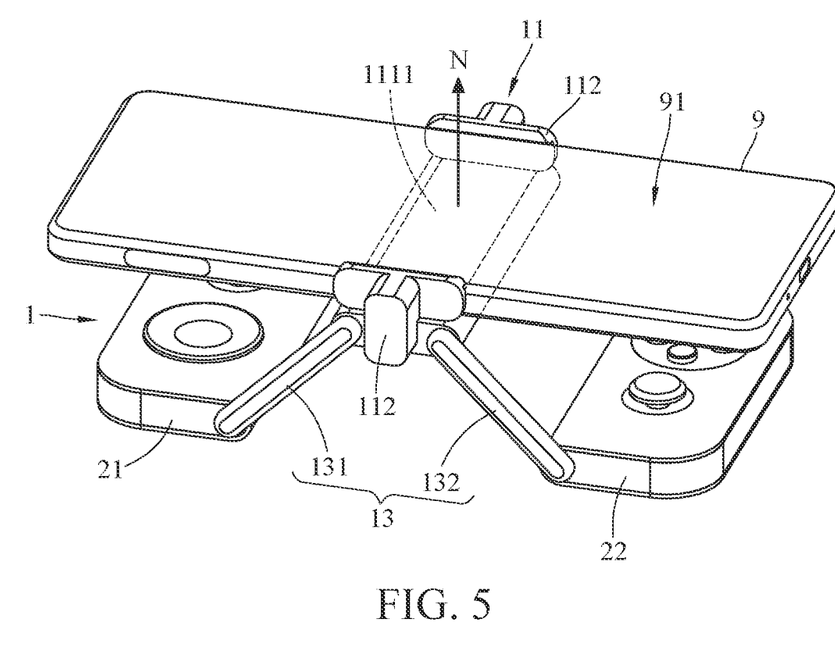
FIG. 5 is a perspective view of the control assembly in FIG. 4 when the control assembly is installed on an electronic device.

For example, please refer to FIGS. 4-5, one of exemplary embodiments of the control assembly 1, as discussed in FIGS. 1-2, is provided. In specific, in this embodiment, the mount seat 11 of the control assembly 1 may include a supporting portion 111 and two clamping structures 112, the supporting portion 111 is the part of the mount seat 11 used to support the electronic device 9, the support surface 1111 is located at the supporting portion 111, the clamping structures 112 are respectively slidably located at two opposite ends of the supporting portion 111 and are configured to clamp the electronic device 9.

In addition, in this embodiment, the linking parts 131 and 132 of the link component 13 are pivotally connected to the supporting portion 111 of the mount seat 11, and the controllers 21 and 22 are pivotally connected to the linking parts 131 and 132. Thus, the controllers 21 and 22 are movable as indicated by the arrows, and the controllers 21 and 22 can be kept in an area underneath the electronic device 9.

Since the controllers 21 and 22 are pivotally connected to the linking parts 131 and 132 and the linking parts 131 and 132 are pivotally connected to the mount seat 11, the angle and positions of both the controllers 21 and 22 relative to the mount seat 11 are flexible. Please see FIG. 6, the controllers 21 and 22 are allowed to be arranged side by side and located at the same side of the mount seat 11, by doing so, the controllers 21 and 22 are in a stored status so that the control assembly 1 is in a relatively small volume. More specifically, when the controllers 21 and 22 are in the stored status, the controllers 21 and 22 may be arranged right under the support surface 1111 of the mount seat 11; in other words, when the controllers 21 and 22 are in the stored status, an orthogonal projection of the mount seat 11 in the normal direction N of the support surface 1111 may partially or fully cover the controllers 21 and 22.

Figure 6:
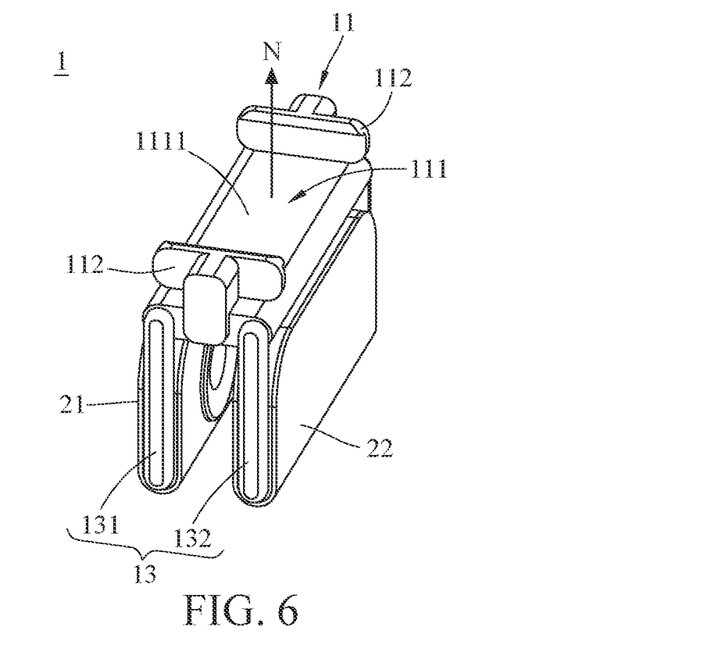
FIG. 6 is a perspective view of the control assembly in FIG. 4 when it is in a stored status.
Figure 7:
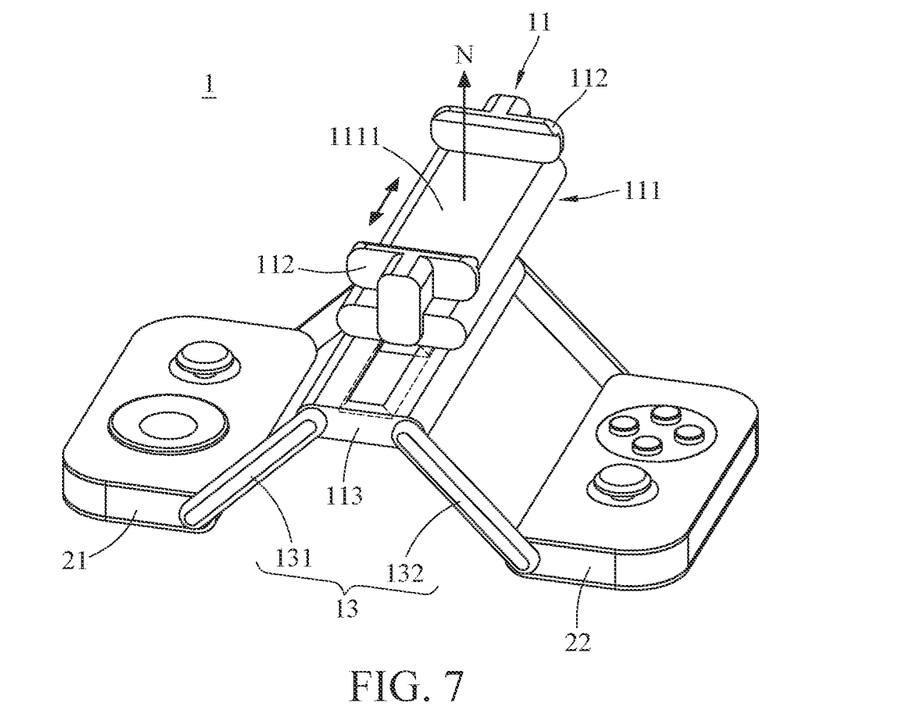
FIG. 7 is a perspective view of a control assembly according to one embodiment of the disclosure.

Alternatively, please refer to FIG. 6, another exemplary embodiment of the control assembly 1 is provided, as shown, the mount seat 11 may further include a base part 113, the supporting portion 111 is slidably disposed on the base part 113 and the linking parts 131 and 132 are pivotally connected to the base part 113. In such an arrangement, the electronic device is allowed to slide relative to the controllers 21 and 22 (as indicated by the arrow).

Figure 8:
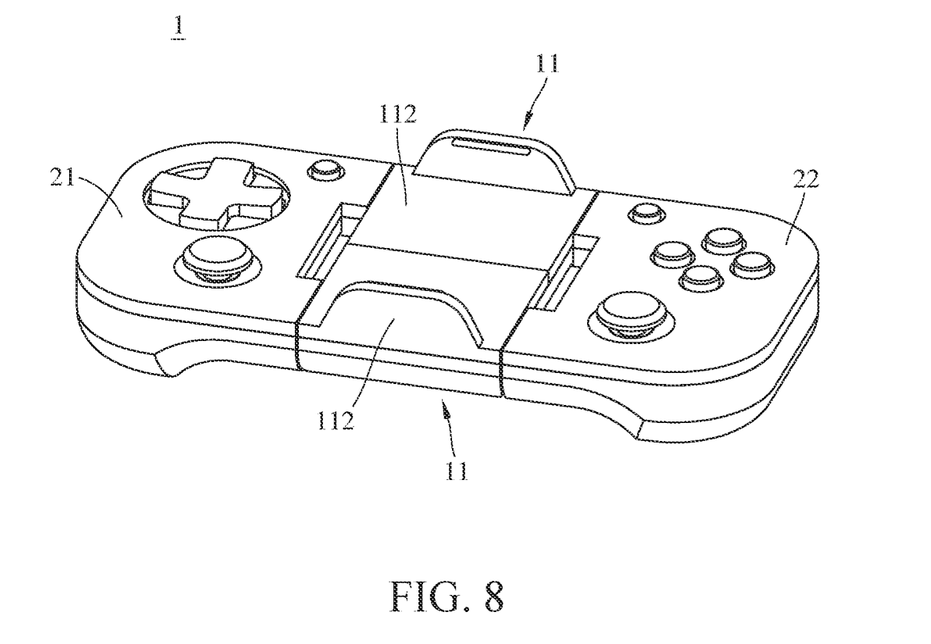
FIG. 8 is a perspective view of a control assembly according to one embodiment of the disclosure.
Figure 9:
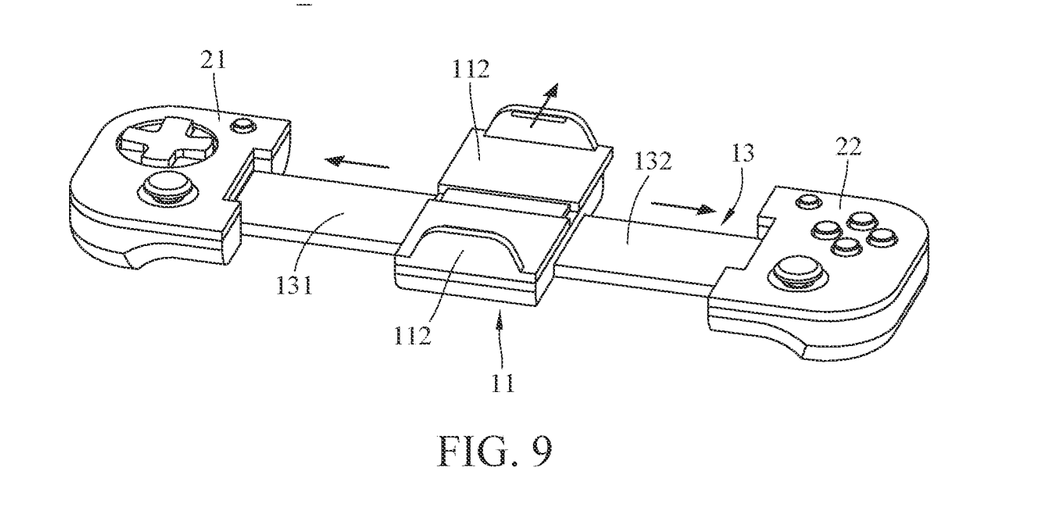
FIG. 9 is a perspective view of the control assembly in FIG. 8 when it is in an extended status.
Figure 10:
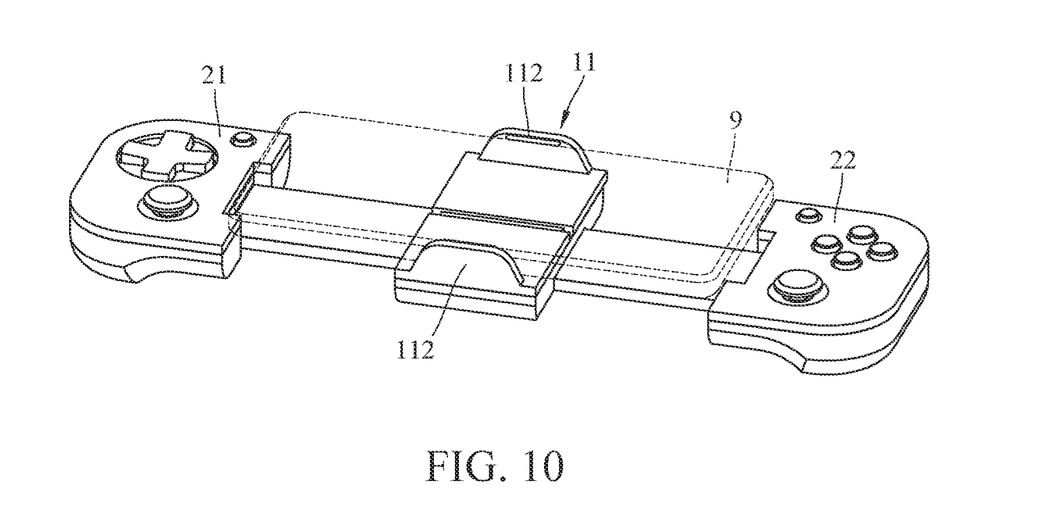
FIG. 10 depicts that an electronic device is installed on the control assembly in FIG. 8.
Figure 11:
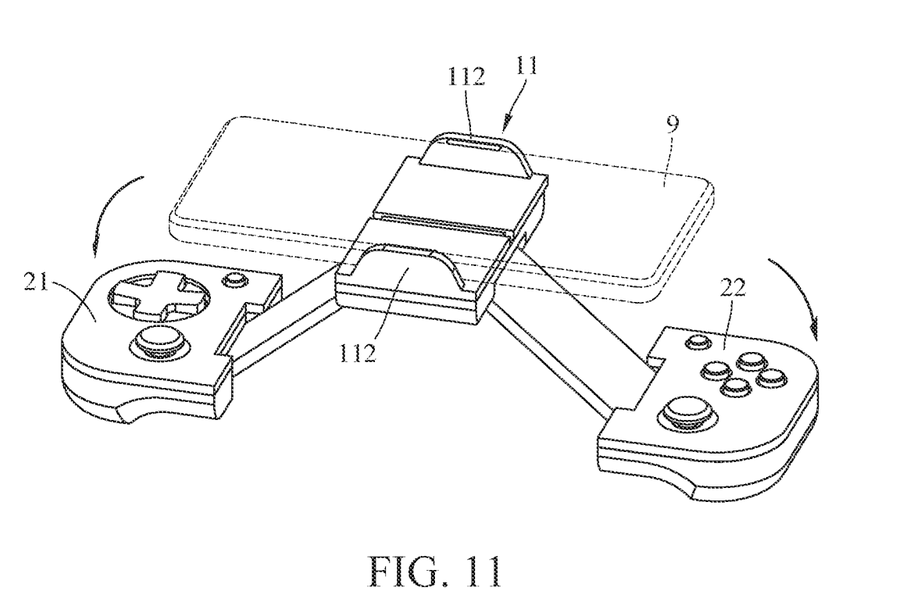
FIG. 11 depicts another status of the control assembly in FIG. 8 when the electronic device is installed thereon.

Alternatively, please refer to FIGS. 8-12, another exemplary embodiment of the control assembly 1 is provided, as shown, the linking parts 131 and 132 of the link component 13 are pivotally connected to two opposite sides of the mount seat 11, and the controllers 21 and 22 are respectively slidably and pivotally connected to the ends of the linking parts 131 and 132 located away from the mount seat 11; in other words, in this embodiment, two opposite ends of each linking part are respectively pivotally connected to the mount seat and one of the controllers, and the controllers are respectively slidably disposed on the linking parts. In such an arrangement, the controllers 21 and 22 are respectively slidable along the linking parts 131 and 132, as indicated by the arrows in FIG. 9, the controllers 21 and 22 are allowed to be moved in a direction towards or away from the mount seat 11, such that the control assembly 1 can be switched to a status as shown in FIG. 8 or an extended status as shown in FIGS. 9 and 10. In addition, the mount seat 11 may include two clamping structures 112, the upper surface of the clamping structures 112 can be served as support surfaces for supporting the electronic device 9. As the arrow shown in FIG. 9, at least one of the clamping structures 112 is movable in a direction different from the sliding direction of the controllers 21 and 22, such that the distance between the clamping structures 112 is changeable for fitting the electronic device 9.

Figure 12:
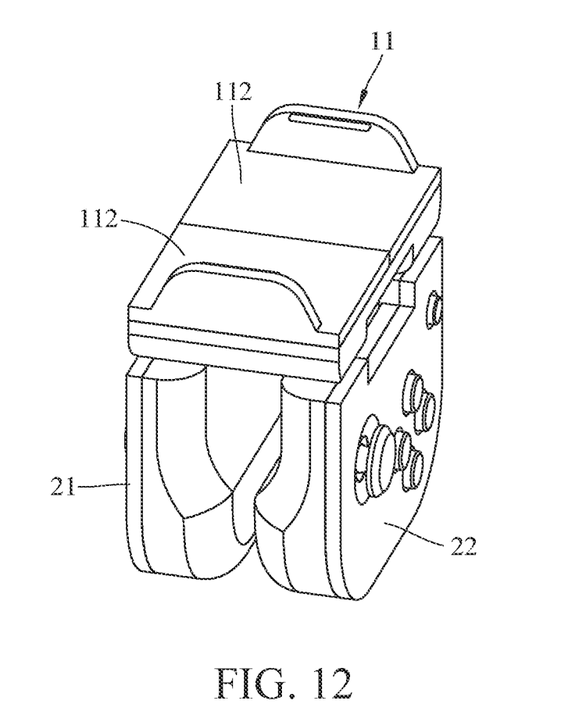
FIG. 12 is a perspective view of the control assembly in FIG. 8 when it is in a stored status.

In FIG. 10, the distance between the controllers 21 and 22 and the distance between the clamping structures 112 can be adjusted to fit the shape of the electronic device 9, such that the control assembly 1 can be served as a smartphone gamepad and uses the controllers 21 and 22 and the clamping structures 112 to stably hold the electronic device 9 in place. Alternatively, in FIG. 11, the linking parts 131 and 132 can be pivoted downwards, such that at least part of each of the controllers 21 and 22 can be located under the electronic device 9. Further, when the control assembly 1 is not yet extended outwards as shown in FIG. 8, the linking parts 131 and 132 are pivotable to allow the controllers 21 and 22 to be folded downwards, by doing so, as can be seen in FIG. 12, the controllers 21 and 22 can be arranged side by side and located underneath the mount seat 11. As discussed, the connections among the mount seat 11, the controllers 21 and 22, and the linking parts 131 and 132 make the controllers 21 and 22 possible to switch among multiple statues.

It is lastly noted that the aforementioned configurations of control assemblies as depicted in FIGS. 4-12 merely are served as exemplary and implementable embodiments that can reflect the concept as depicted in FIGS. 1-2 but are not intended to limit the disclosure. It will be apparent to those skilled in the art that various modifications, variations, and alternative embodiments for implementing the schematically depicted concept of FIGS. 1-2 all can be made to the present disclosure. It is intended that the specification and examples be considered as exemplary embodiments only, with a scope of the disclosure being indicated by the following claims and their equivalents.

What is claimed is:

1. A control assembly adapted for an electronic device, comprising:
    a mount seat configured to be installed on the electronic device, wherein the mount seat has a support surface configured to support the electronic device;
    at least one link component connected to the mount seat; and
    two controllers configured to electronic communicate with the electronic device, wherein the two controllers are separated from each other and movably connected to the mount seat via the at least one link component;
    wherein the two controllers are spaced apart from the support surface of the mount seat along a normal direction of the support surface so that an orthogonal projection of the electronic device along the normal direction of the support surface overlaps with at least part of each of the two controllers.

2. The control assembly according to claim 1, wherein the at least one link component comprises at least two linking parts, the two controllers are respectively movably connected to two opposite sides of the mount seat via the at least two linking parts.

3. The control assembly according to claim 2, wherein the at least two linking parts are respectively pivotally connected to two opposite sides of the mount seat.

4. The control assembly according to claim 3, wherein the two controllers are respectively pivotally connected to the at least two linking parts.

5. The control assembly according to claim 3, wherein the at least two linking parts are respectively slidably and pivotally connected to the two controllers.

6. The control assembly according to claim 2, wherein the mount seat comprises a supporting portion and two clamping structures, the supporting portion has the support surface, the two controllers are movably connected to the supporting portion, the two clamping structures are respectively slidably located at two opposite ends of the supporting portion and are configured to clamp the electronic device.

7. The control assembly according to claim 2, wherein the mount seat comprises a supporting portion, two clamping structures, and a base part, the supporting portion has the support surface and is slidably disposed on the base part, the two controllers are movably connected to the base part, the two clamping structures are respectively slidably located at two opposite ends of the supporting portion and are configured to clamp the electronic device.

8. The control assembly according to claim 4, wherein the two controllers have a stored status, when the two controllers are in the stored status, the two controllers are arranged side by side and an orthogonal projection of the mount seat along the normal direction of the support surface covers at least part of each of the two controllers.

9. The control assembly according to claim 1, wherein the two controllers are configured to electronic communicate with the electronic device in a wired manner.

10. The control assembly according to claim 1, wherein the two controllers are configured to electronic communicate with the electronic device in a wireless manner.

* * * * *